Oct. 21, 1969     R. E. SZUPILLO     3,474,305
DISCONTINUOUS THIN FILM MULTISTABLE STATE RESISTORS
Filed March 27, 1968     5 Sheets-Sheet 1

INVENTOR.
Raymond E. Szupillo
BY
*Walter S. Zebrowski*
ATTORNEY

INVENTOR.
Raymond E. Szupillo

United States Patent Office 3,474,305
Patented Oct. 21, 1969

3,474,305
DISCONTINUOUS THIN FILM MULTISTABLE
STATE RESISTORS
Raymond E. Szupillo, Painted Post, N.Y., assignor to
Corning Glass Works, Corning, N.Y., a corporation
of New York
Filed Mar. 27, 1968, Ser. No. 716,630
Int. Cl. H01l 5/00, 15/00, 3/00
U.S. Cl. 317—234                                    13 Claims

ABSTRACT OF THE DISCLOSURE

Metallic discontinuous thin films electrically connected in parallel between a pair of terminal electrodes thereby providing a reliable non-linear voltage sensitive resistance device having a plurality of stable resistance states. The potential at which the device switches from one stable resistance state to another, and the range of resistance values of each state is obtained as desired by controlling the thickness of deposition of the individual films. The resistive property of each film is permanently stabilized by preventing the agglomeration of the film's nucleations by a protective barrier layer of dielectric material.

Background of the invention

The term discontinuous thin film relates to a thin film structure which has a multitude of minute yet distinctly separate nucleations or island masses of material. Such film structures are known to occur during the initial stages of film deposition when employing such conventional processes as vacuum evaporation, sputtering, electron beam evaporation, and the like. At some point in the deposition process a sufficient quantity of material collects upon a given surface of deposition to permit agglomeration of the nucleations into a continuous film mass of more or less uniform density throughout.

Discontinuous thin films have also been obtained through anodization of continuous thin films wherein portions of material near the surface of the film are oxidized thus forming an electrically insulative barrier layer over the remaining unoxidized portions of the film. Provided that a sufficient surface quantity of the film is oxidized, the remaining unoxidized portion will nucleate into a discontinuous thin film structure.

Of particular interest is the fact that metallic discontinuous thin films have radically different properties of electrical conductivity in comparison with those of their more massive continuous film counterparts due to the discontinuity of electrically conductive paths therein. In some manner, as yet not completely understood, the gaps or channels between the nucleations of discontinuous thin films provide an interisland tunneling mechanism of electron transport which effectively shunts the high resistance of the dielectric substrate upon which the film is disposed. Electrical current is thereby permitted to flow through such films when an electrical potential is applied. It has been suggested that the film nucleations may act as "cold" cathodes when subjected to electric fields, emitting electrons into the interisland channels from whence the electrons tunnel their way to neighboring islands either through portions of the underlying dielectric substrate or above the same.

Whatever is the exact nature of the electron transport mechanism, it has been found that metallic discontinuous thin films composed of metals of otherwise high conductivity such as gold, tantalum, titanium, chromium, nickel, and the like do not conform to Ohms Law of Resistance. Rather, a non-linear voltage-current relationship exists with a sharp discontinuity therein at which, upon application of a particular value of potential, hereinafter referred to as the switching potential, the film's resistance level changes sharply from a state of generally low value to a state of generally high value. The difference in resistance between the low and high resistance state may be as great as three orders of magnitude and possibly more depending on the particular film in question.

Referring to FIGURE 1 there is graphically illustrated the general relationship between the resistance of a typical discontinuous thin film and the magnitude of DC electrical potential applied thereto. The switching potential of the film is designated as $V_A$. It will be noted that for any applied voltage below this value the resistance of the film is of generally low value. If the voltage across the film is raised to the switching potential $V_A$, the film resistance switches sharply to the high resistance state. Thereafter the resistance of the film undergoes a slight increase in value in a linear manner as the applied voltage is further increased. The voltage range above the switching potential $V_A$ is referred to as the high resistance state while the voltage range below $V_A$ is referred to as the low resistance state. Accordingly such resistance-voltage characteristics would ordinarily render discontinuous thin films suitable for electrical switching applications were it not for serious problems of excessive heat dissipation which have heretofore been encountered.

The problem is more readily appreciated when it is recognized that when the applied voltage is less than the switching potential $V_A$, the film resistance is likely to be quite low compared to the internal resistance of most practical applied voltage sources or to the resistance of a series connected load resistor. Consequently while in the low resistance state the open circuit source potential is markedly distributed between its own internal resistance, the series load resistance and the resistance of the film. However, upon switching to the high resistance state, the internal source resistance and the series load resistance become small in comparison to the resistance of the film such that, for practical purposes, the open circuit source voltage appears entirely across the film. This drastic redistribution of source potential is very difficult to eliminate in most practical switching circuits. As a result, excessive heating of the minute mass of film material ordinarily occurs during high resistance state conditions sufficient to destroy the useful electrical properties of the film in short order.

I have discovered that, not only can the above-mentioned difficulty be prevented by electrically connecting two or more discontinuous thin films in parallel, but that a new and useful device is obtainable which has more than two stable resistance states as desired, the number of such states being the same as the number of films connected in parallel. Each of the films of the parallel combination is deposited in such manner as to provide each with a different value of switching potential. Accordingly, each film which switches from its low to its high resistance state, does so at a voltage which falls within the decreasing resistance region of the film having the next higher switching potential. Because of this, the drastic redistribution of source voltage previously explained is limited by the fact than any increase in voltage across the parallel film combination which occurs when a given film switches to its high resistance state is met by a decrease in resistance of the film having the next higher switching potential. Though the redistribution of source potential is not eliminated as, indeed some redistribution is essential for the device to function in a practical circuit as a multistable resistance device, such redistribution is held within reasonable limits. Further, by so limiting the redistribution of source potential, the possibility of unwanted switching of the resistance states of more than one film at a time, when only a single switching increment of source potential is applied to the device, is markedly reduced.

When one or more of the films are operated in their high resistance states, the films remaining in their low resistance states are the dominant current conducting branches of the parallel combination. The films operating in their high resistance states carry only small portions of the total circuit current and, as a result, power dissipation therein is safely maintained below the level of film destruction.

The different values of switching potentials required are obtained by controlling the thickness of the individual films during their deposition, and by stabilizing the nucleations of each film so deposited, as to prevent subsequent changes in their electrical properties.

The maximum number of stable resistance states obtainable by my method depends upon the extent to which one may obtain the required number of films, having sufficient separation between their individual switching potentials, with existing and well known processes of film deposition and film thickness control. As the number of films is increased in order to obtain an increased number of stable states, it becomes increasingly difficult to obtain the desired switching potential and open circuit resistance value of the film of highest switching potential. This is because the higher the switching potential desired, the higher the value of open circuit resistance required. Unfortunately this requires the deposition of successively thinner films, which are, in general, successively more difficult to stabilize at a desired resistance value. Moreover, due to extreme instability, the open circuit resistance value of the thinnest film in the combination may increase in value so rapidly that, by the time the film is stabilized following its deposition, its low resistance state may be higher in value than the high resistance states of the remaining films. In such a case the film cannot be expected to carry a very large proportion of the total circuit current, when all the remaining films are operating in their high resistance states.

Summary of the invention

It is therefore an object of the instant invention to provide a reliable multi-stable discontinuous thin film resistor and to overcome the hereinabove noted disadvantages.

It is a further object of the instant invention to provide protection for a discontinuous thin film against excessive power dissipation therein as a result of its operation in a high resistance state.

Briefly, in accordance with the instant invention, a multi-stable state resistance device is provided comprising a plurality of discontinuous thin films, each film having a different value of switching potential, and each being electrically connected in parallel with the others. The parallel combination of films is terminated in such manner as to permit the making of electrical connections thereto. The electrical properties of the films are stabilized against variation with the passage of time by forming a protective layer of electrically insulative barrier material over the films.

Additional objects, features and advantages of the instant invention will become apparent to those skilled in the art from the following detailed description and attached drawings, on which, by way of example, only the preferred embodiments of the instant invention are illustrated.

Detailed description

Figure 1:
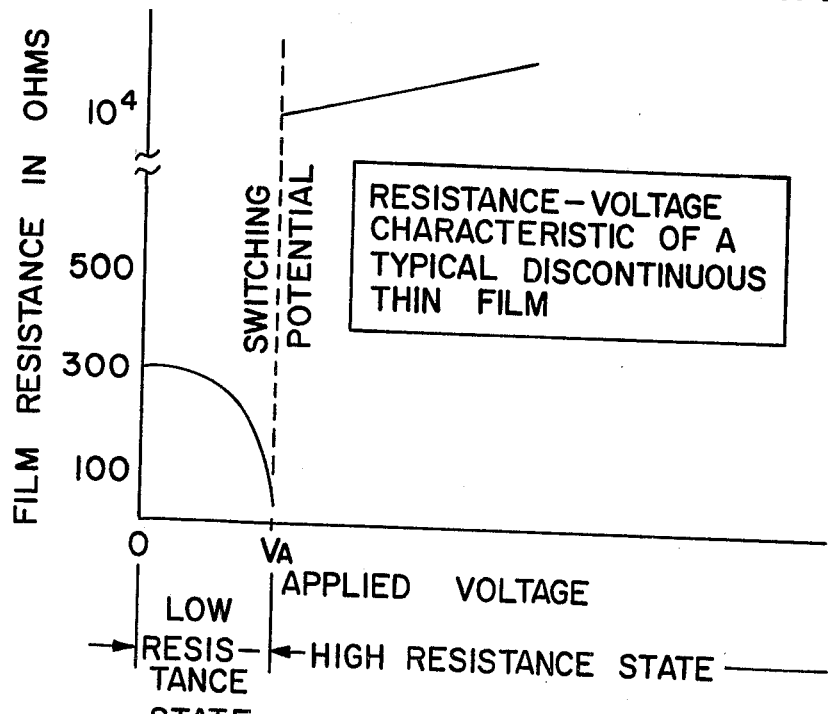
FIGURE 1 shows a graphical representation of the resistance change of a typical single discontinuous thin film as a function of applied voltage.
Figure 2:
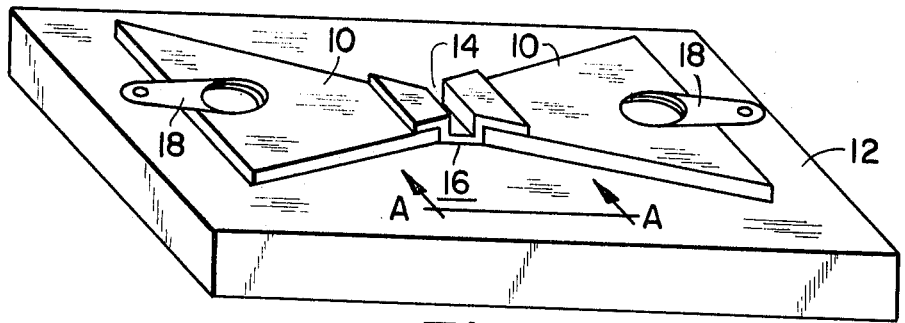
FIGURE 2 is an oblique view of a bi-stable discontinuous thin film resistor illustrating one embodiment of the instant invention.

Referring to FIGURE 2 there is shown a pair of tapered terminal electrodes 10 having flat tips oppositely disposed from one another on a flat dielectric substrate 12 so as to form a rectangularly shaped channel 14 therebetween. On the portion of the dielectric substrate 12 which forms the base of the channel 14 there is disposed a series of layers of materials comprising a discontinuous thin film multistable resistance element 16 which makes electrical contact to the electrodes 10 along the flat tips thereof. Near the ends of each of the electrodes 10 opposite the channel 14 there is provided a terminal mounting post 18 for the purpose of making suitable electrical circuit connections to the resistance element 16. The tapered configuration of the electrodes 10 is not essential to the operation of the device but permits the electrodes 10 to have small flat tips while providing ample surface area near the ends thereof for the making of suitable electrical connections.

The electrodes 10 may be composed of any suitable electrically conductive material such as gold, silver, copper, platinum, tantalum, or the like. The electrodes 10 may be affixed to the substrate 12 by any suitable mechanical mounting means, or may be applied thereto in the form of a thin patterned layer of continuous film using conventionl film deposition means such as vacuum evaporation, electron beam evaporation, sputtering, or the like. The substrate 12 is composed of any conventional electrically insulative material such as dielectric glass, alumina, plastic, glass-ceramic material or the like. The following specific examples will enable those skilled in the art to more readily practice the instant invention.

EXAMPLE I

Referring to FIGURES 2 through 7, there is shown a pair of terminal electrodes 10 consisting of two patterned gold films 2,000 A. to 5,000 A. in thickness, which are deposited upon a dielectric glass substrate 12 in such manner as to form a channel 14 between their flattened tips having dimensions of about 0.001 inch by about 0.020 inch. The deposition is made by evaporation of a 200 milligram strip of 99.95 percent pure gold from a clip attached to a tungsten heater filament inside a bell jar or vacuum chamber.

Figure 3:
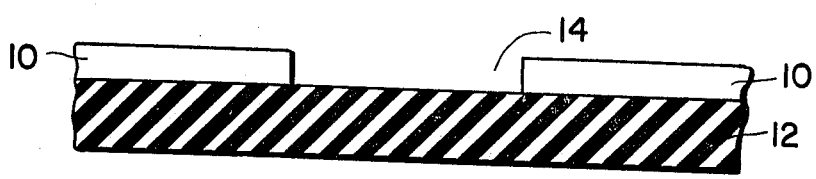
FIGURES 3 through 7 illustrate the steps in the fabrication of the bi-stable discontinuous thin film resistive element shown generally in FIGURE 2 along cross-sectional lines A—A.

A 1 x 3 inch flat glass dielectric substrate 12 is suitably masked in any well known manner, so as to expose selected portions of its surface upon which the gold electrodes 10 are to be deposited, and placed within the bell jar at a distance of about 8 to 10 inches from the filament. The pressure inside the bell jar is reduced to about $10^{-6}$ torr. The tungsten filament is heated until the gold strip is completely evaporated. FIGURE 3 shows the tips of the electrodes 10, and the channel 14 formed thereby, following deposition of the gold electrodes 10 on the substrate 12 after removal of the electrode patterning mask.

Figure 4:
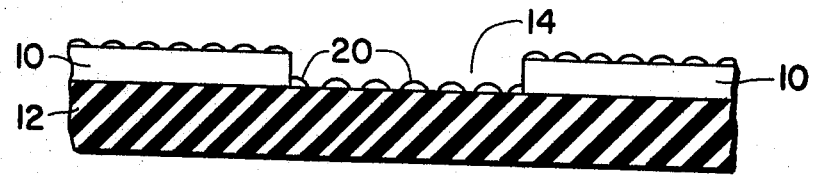

Referring to FIGURE 4 a first gold discontinuous thin film 20 is deposited across the length and width of the channel 14. The open circuit ohmic resistance of the film 20 of the instant example is approximately 3,000 ohms and is obtained by evaporating a supply of 99.95 percent pure gold from a tungsten heater filament in a bell jar having a pressure of about $10^{-6}$ torr. The substrate 12 of FIGURE 3 is suitably masked to permit gold deposition within the channel 14 and is subjected to the gold vapor in the bell jar in the same manner as deposition of the electrodes 10 as previously explained. Condensation of the gold vapor in the channel 14 is permitted to continue until a 3,000 ohm resistance is obtained between the electrodes 10 as measured on a high resistance ohmmeter. In measuring the resistance of the gold film 20 during its deposition, care is taken to insure that the voltage applied to the film 20 by the ohmmeter is not so large as to switch the film 20 to its high resistance state. Ordinarily, this is not a significant problem with conventional high impedance ohmmeters in which the voltage across the meter leads is usually only a fraction of a volt. Nevertheless, should such switching occur during deposition, the desired electrical properties of the film 20 would be destroyed due to excessive power dissipation therein.

Figure 5:
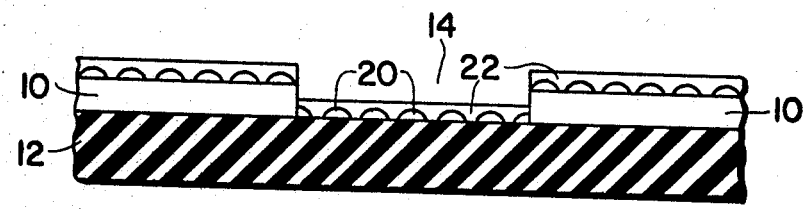

Immediately, upon completing the deposition of the film 20 a first barrier layer 22 composed of a suitable electrical insulating material such as silicon dioxide, barium oxide, tantalum pentoxide, titanium dioxide or the like is deposited thereon as shown in FIGURE 5. The nucleations of discontinuous thin films are highly unstable due to the high surface tensions present therein, and therefore tend to agglomerate together rapidly into fewer islands of increasingly larger size. The growth of these islands together into fewer numbers produces a continuously increasing separation in the distance between the remaining islands and causes the resistance of the film 20 to increase correspondingly. It is therefore necessary to stabilize the film 20 by halting the growth of these nucleations and thereby stabilize the open circuit resistance and switching potential of the film 20 at or near the desired values.

Stabilization is obtained by depositing a first barrier layer 22 of barium oxide having a thickness of between 300 A. and 1,200 A. Accordingly, barium carbonate particles are evaporated from an alumina crucible, heated by a tungsten wire coil, onto the gold film 20 in the same bell jar as used previously. Using the same bell jar permits the deposition of the barrier layer 22 immediately following deposition of the gold film 20 without the necessity of removing the substrate 12. The pressure in the bell jar is about $10^{-6}$ torr at the beginning of the barium oxide deposition but will increase somewhat during the process due to the dissociation of the barium carbonate into gaseous carbon dioxide and barium oxide vapor. The rate of barium oxide deposition is somewhat unpredictable as a result. However, this difficulty can be overcome by using other barrier materials which vaporize and condense directly without dissociating into gaseous substances in the process, such as barium oxide, silicon dioxide, or the like. As will readily be understood by those skilled in the art, the thickness of the barium oxide layer 22 may be monitored continuously during the process by observing shifts in the resonant frequency of a quartz crystal monitor as the crystal is subjected to the condensation occurring in the bell jar, or by any other suitable and well known method.

Figure 6:
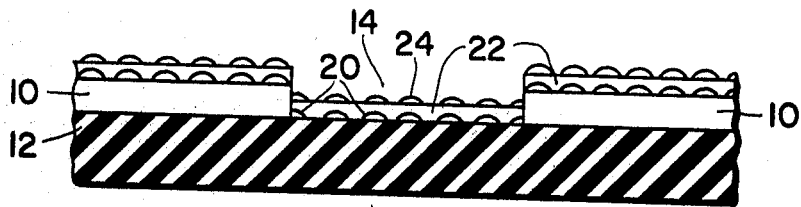

Referring to FIGURE 6, a second gold discontinuous thin film 24 having an open circuit resistance of 300 ohms is deposited on the first barrier layer 22 by the gold deposition method previously explained. In this manner the first barrier layer 22 serves two functions. First, it operates to stabilize the first film 20 and, second, it serves as the substrate for the second film 24. The second gold film 24 is selected to have the lowest open circuit resistance value of the two films 20 and 24 because the measurement of its resistance during deposition is in effect the measurement of the equivalent resistance of the films 20 and 24 in parallel. Since the open circuit resistance of the first film 20 is about an order of magnitude greater than the open circuit resistance of the second film 24 of the instant example, measurement of the resistance of the parallel films 20 and 24 yields effectively the resistance of the second film 24. However, the fact that the films 20 and 24 of the instant example are deposited in this order is in no way essential to the operation of the device or to its method of fabrication.

Figure 7:
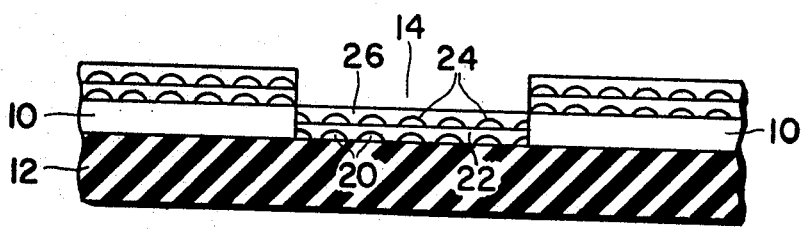

Referring to FIGURE 7, a second barrier layer 26 consisting of barium oxide is deposited on the second gold film 24 by vacuum evaporation in the same manner as previously explained. This deposition is performed as quickly as possible in order to stabilize the second gold film 24 at or near the 300 ohm open circuit value obtained upon completion of its deposition. This completes the fabrication of a bi-stable discontinuous thin film resistor.

Figure 8:
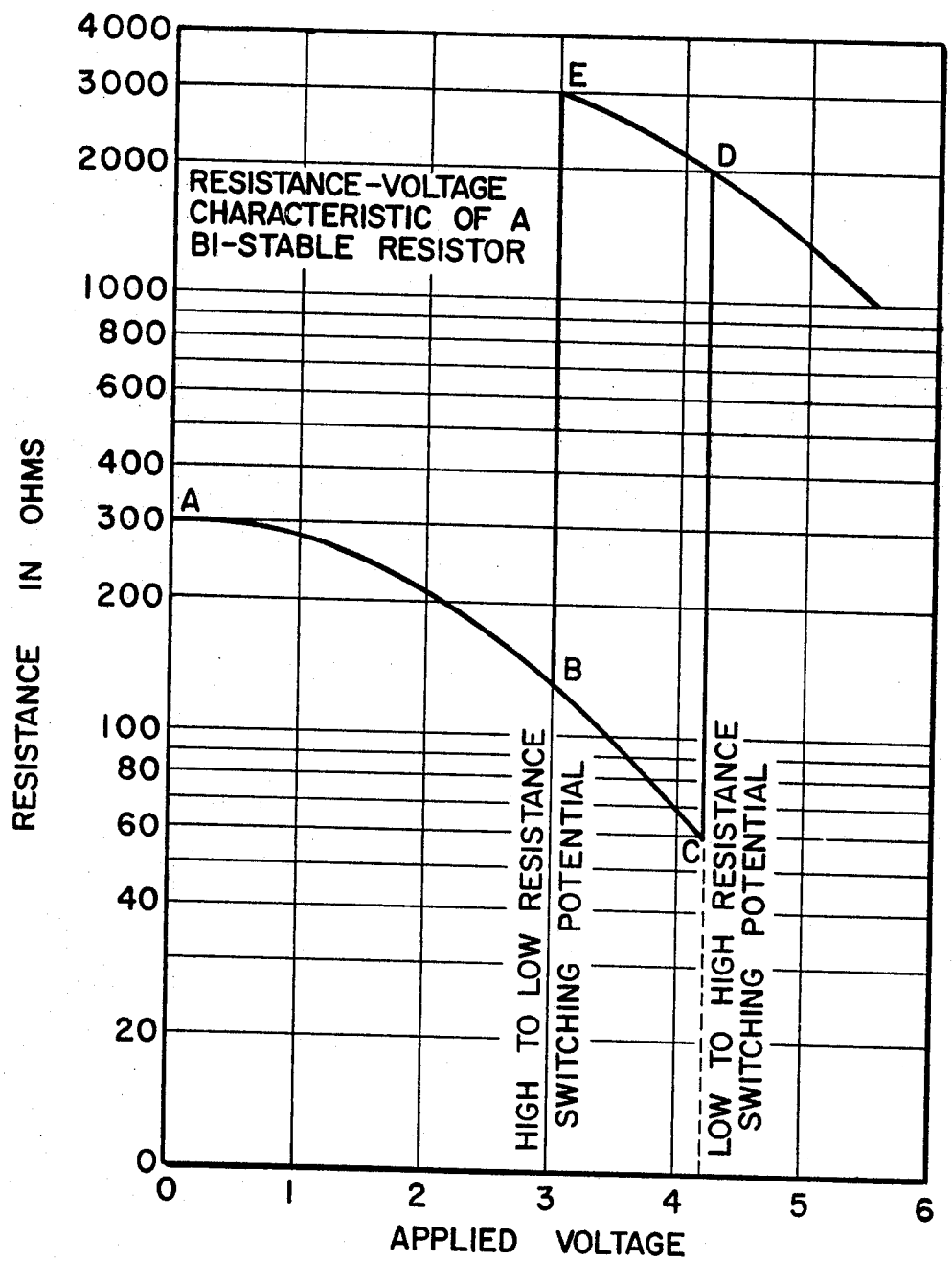
FIGURE 8 illustrates graphically the relationship between the resistance of a bi-stable discontinuous thin film resistor and applied voltage.

Referring to the graph shown in FIGURE 8, the portion of the characteristic curve represented by the points A, B and C represents the low resistance state of the bi-stable resistor of the instant example. The portion of the curve represented by the points D and E is the high resistance state of the device. The bi-stable resistor of the instant example switches from the low to the high resistance state along the line segment from C to D at a switching potential of 4.2 volts, and switches from the high to the low resistance state along the line segment from E to B at a switching potential of 3.0 volts.

Figure 11:
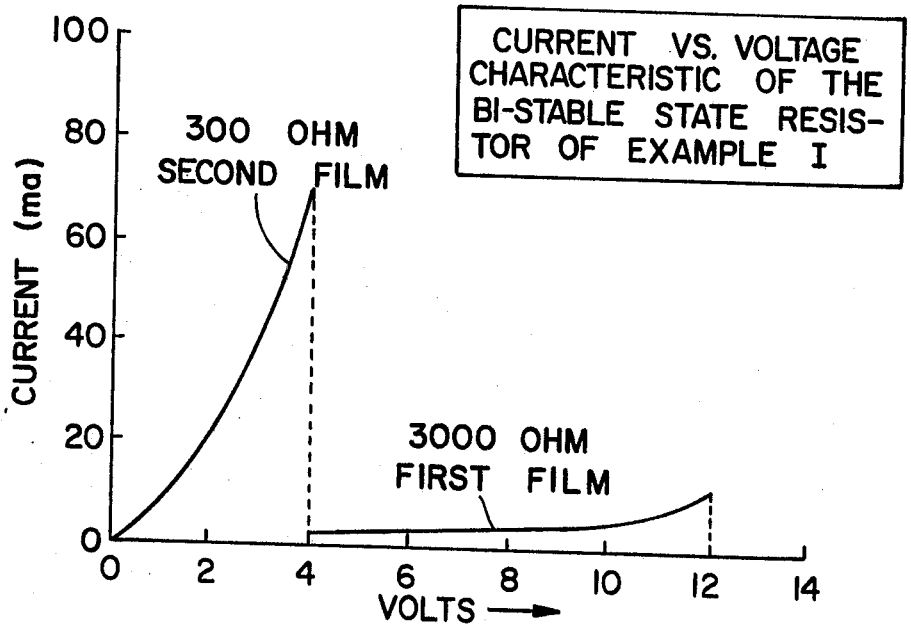
FIGURE 11 shows graphically the current vs. voltage characteristic of the bi-stable resistor of Example I.

Referring to FIGURE 11 the current vs. voltage relationship of the bi-stable resistor of the instant example is graphically illustrated. It should be noted that the switching potential of the first film 20 is about 12 volts. Consequently, the voltage applied to the device must not be permitted to exceed this value under operating conditions or else both films 20 and 24 will be switched into their high resistance states and excessive power dissipation will most likely occur. Since the separation between the switching potentials of the films 20 and 24 is about 8 volts, the danger of this occurring inadvertently is fairly remote.

Referring to FIGURES 2 through 7, the bi-stable resistive element of the instant example, having both the discontinuous thin films 20 and 24 deposited in stacked relationship with a thin layer 22 of electrically insulating barrier material therebetween, is compactly constructed on a small portion of the substrate 12 defined by the channel 14. As will be appreciated by those skilled in the art, parallel combinations of two discontinuous thin films having the desired resistive properties is obtainable in numerous other configurations, e.g., side-by-side relationship of two discontinuous thin films on a single dielectric substrate, and the like. The desired range of resistance values for both the low and high resistance states, the separation between resistance states, and the switching potential of the resistor can be adjusted as desired by controlling the thickness of deposition of the two discontinuous thin films 20 and 24 and monitoring their resistance values during the process as described in the instant example. It is to be noted that the thicker the film being deposited, the lower will be its open circuit resistance and switching potential, assuming that the film remains discontinuous in structure. Conversely, the thinner the deposition, the higher will be the films open circuit resistance and its switching potential.

EXAMPLE II

Figure 9:
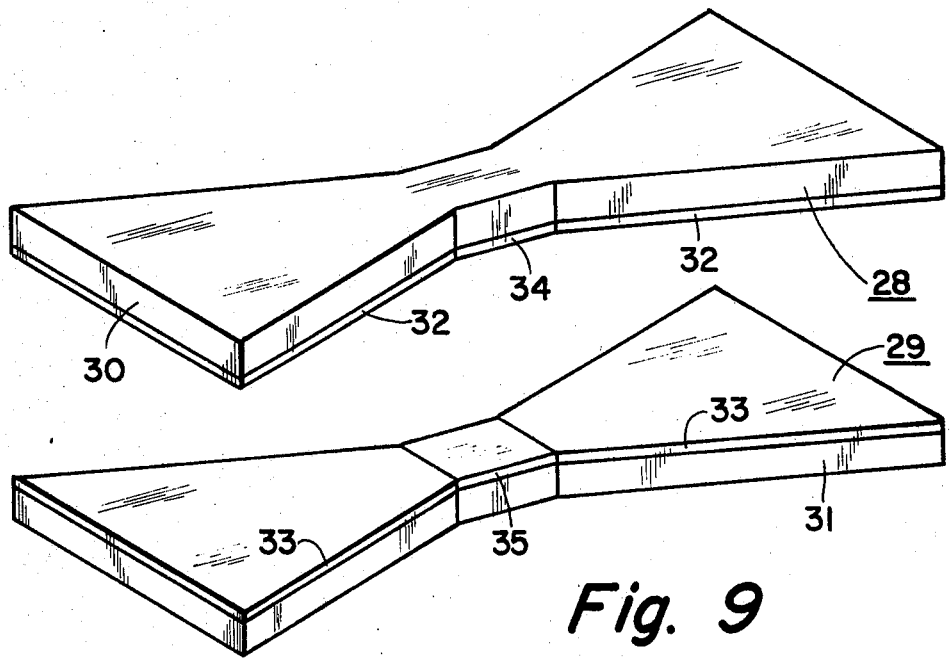
FIGURE 9 shows an exploded oblique view of a bi-stable discontinuous thin film resistor illustrating another embodiment of the instant invention.

Referring to FIGURE 9, there is shown a pair of bow tie shaped resistor sections 28 and 29 consisting of a pair of dielectric substrates 30 and 31, and two pairs of trapezoidal shaped metallic film terminal electrodes 32 and 33. The resistive element 34 is electrically connected between the electrodes 32 and, similarly, the resistive element 35 is electrically connected between the electrodes 33. The resistive elements 34 and 35 each consist of a single metallic discontinuous thin film, not shown, covered by an electrically insulative layer of metallic oxide barrier material. The resistive elements 34 and 35 are electrically connected in parallel to form a bi-stable resistor by clamping the sections 28 and 29 together in stacked relationship. The resistor sections 28 and 29 of the instant example are each fabricated in two stages; first, by depositing a thin continuous film of electrically conductive metal uniformly over one side of the substrates 30 and 31, and secondly, by anodizing the metal films disposed on the neck portions of the substrates 30 and 31 so as to form a discontinuous thin film covered by a metallic oxide barrier layer and joined at either end by the trapezoidal shaped unoxidized metal film electrodes 32 and 33 respectively.

Specifically, considering the fabrication of a single electrode section 28, a bow tie shaped flat glass dielectric substrate 30 is provided, onto one side of which is sputtered a 100 A. thick layer of tantalum. Such a thickness is sufficient to render the tantalum film continuous yet is thin enough to readily obtain a discontinuous thin tantalum film through anodization of surface portions thereof. The tantalum film is deposited by a conventional sputtering method such as, for example, by sputtering material from a 99.95 percent pure tantalum foil disc shaped cathode onto a glass substrate in a vacuum chamber containing an argon atmosphere at one micron of mercury pressure. The tantalum is sputtered through a voltage gradient of 800 volts/cm. at a current density of 0.1 ma./cm.$^2$. It should be noted that the thickness of the tantalum deposition should be chosen so as to permit obtaining the discontinuous thin film having the desired value of resistance through anodization. A tantalum layer being too thick in cross section makes it difficult to anodize a sufficient quantity of the film in order to render the remaining unoxidized portion discontinuous. However, depositions of up to about 500 A. in thickness and possibly higher may be made without incurring this problem. The glass substrate containing the continuous tantalum film thereon is removed from the vacuum sputtering chamber and the film is masked in a manner to prevent oxidation of the terminal electrode portions of the film during the anodization process to follow. Any suitable vinyl masking tape, well known in the art, which is impervious to boric acid is used to cover the trapezoidal portion 32 of the tantalum film which would otherwise be exposed to the anodizing electrolyte. Only the tantalum film on the neck portion of the bow tie shaped substrate 30 is to be anodized as it is this portion which is to serve as the resistive element 34.

Figure 10:
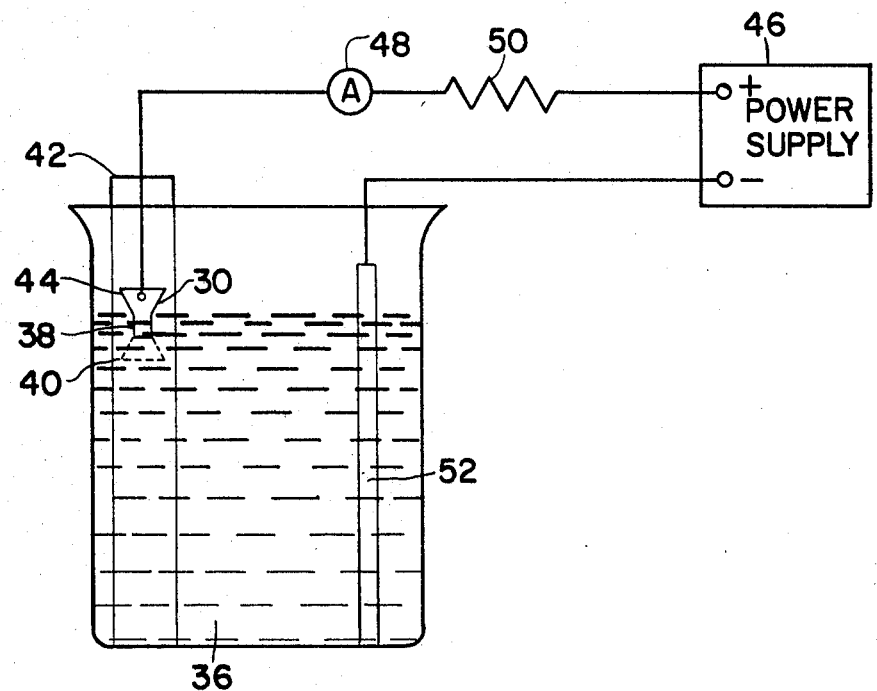
FIGURE 10 illustrates the fabrication of a discontinuous thin film from a continuous thin film by anodization in accordance with one method of the instant invention.

Referring to FIGURE 10, a conventional method of anodization is employed. The glass substrate 30 containing the tantalum film on one side is partially immersed in an electrolyte 36, having a composition of 1 gram of boric acid, and 3.25 grams of fused ground borax glass, $Na_2B_4O_7$, to each 500 cc. of distilled water, so as to anodize only the neck portion 38 of the tantalum film. A vinyl resist mask 40 taped against the tantalum film prevents anodization of the immersed trapezoidal portion thereof. The glass substrate 30 is affixed to a suitable glass support 42 in any convenient manner to permit immersion of only the desired portion of the film within the electrolyte 36. The trapezoidal portion of the film which is not exposed to the electrolyte 36 is used as a terminal electrode 44 during the anodization process and is electrically connected to the positive terminal of a suitable power supply 46. An ammeter 48 is series connected between the electrode 44 and the power supply 46 in order to permit measurement of electrical current during the anodization process. A suitable current limiting resistor 50 as for example, one having resistance of 100K ohms, is series connected between the electrode 44 and the positive terminal of the power supply 46 in order to prevent high current surges which otherwise might occur during the initial stages of anodization before a significant quantity of electrically resistive oxide has formed. A second electrode 52 having high electrical conductivity but which is chemically non-reactive with the electrolyte 36 such as an aluminum rod is inserted into the electrolyte 36 and electrically connected to the negative terminal of the power supply 46.

The power supply 46 is turned on at a low voltage level and raised in value until a current sufficient to produce anodization of the neck portion 38 of the tantalum film flows. The process is continued until a sufficient quantity of film has oxidized such that the unoxidized portion remaining thereunder is reduced to a discontinuous thin tantalum film having the desired open circuit resistance and switching potential. The resistance of the neck portion 38 is monitored throughout the process in any suitable manner such as by removing the support 42 from the electrolyte 36 periodically and measuring the resistance of the film between the two trapezoidal end portions thereof with an ohmmeter. Discontinuous thin films occur when the open circuit resistance of the film increases with anodization above the values ordinarily associated with highly conductive continuous thin films.

Referring to FIGURES 9 and 10, both of the resistor sections 28 and 29 are fabricated in the same manner as previously explained except that the resistance values of the two sections 28 and 29 differ by about an order of magnitude or more depending upon the precise switching characteristics desired. The difference in resistance values between the low resistance states of the resistive elements 34 and 35 is obtained by anodizing the tantalum on one of the sections 28 and 29 to a greater extent than the other. The section 28 of the instant example is anodized until an open circuit resistance of 5,000 ohms is obtained. The section 29 is fabricated in the same manner as the first except that its resistive element 35 is anodized to an open circuit resistance of 500 ohms. The two sections 28 and 29 are thereafter clamped together whereby the resistive elements 34 and 35 are electrically connected in parallel providing a single voltage sensitive bi-stable discontinuous thin film resistor.

EXAMPLE III

A tri-stable state discontinuous thin film resistor is provided having the same physical shape as the resistor shown in FIGURE 2 wherein the resistive element 16 consists of three discontinuous thin films of gold stabilized by three electrically insulative layers of barium oxide barrier material. The manner of deposition and stabilization of each of the films is the same as previously described for the films 20 and 24 of Example I. In the instant example a first film is deposited on the substrate 12 to a thickness corresponding to a final stabilized open circuit resistance value of 54,000 ohms. Stabilization is obtained with barium oxide in the same manner as previously explained in Example I. A second gold film is deposited to a final stabilized open circuit resistance value of 25,000 ohms. The second gold film is stabilized with a second layer of barium oxide barrier material as previously explained. A third discontinuous thin film of gold is deposited on the second barrier layer to a final stabilized open circuit resistance value of 11,000 ohms. The third gold film is likewise stabilized with a layer of barium oxide barrier material as previously explained in Example I.

Figure 12:
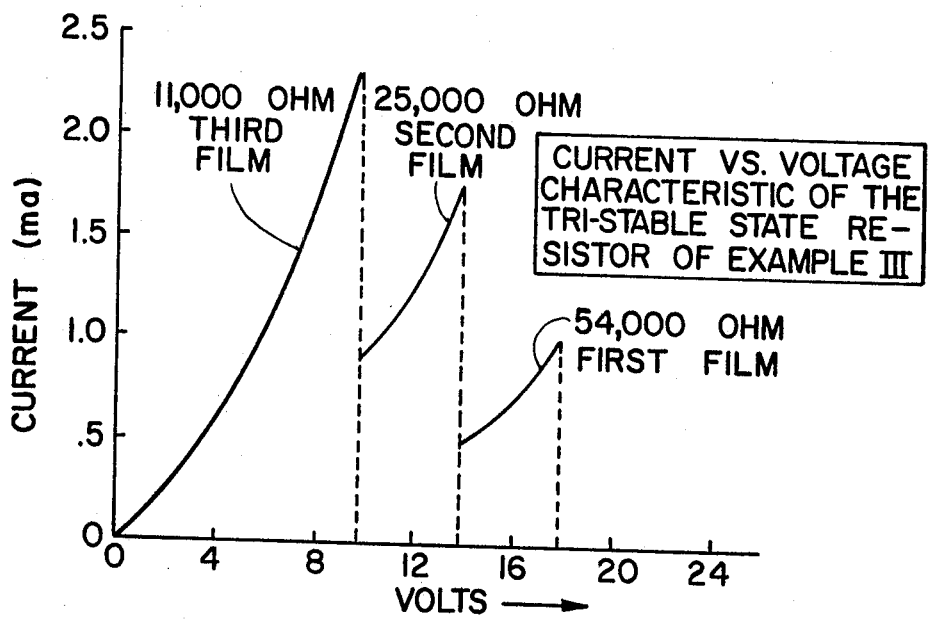
FIGURE 12 shows graphically the current vs. voltage characteristic of the tri-stable resistor of Example III.

FIGURE 12 shows graphically the current vs. voltage characteristic for the tri-stable state resistor of the instant example. The 54,000 ohm film has a switching potential of about 18 volts. The second film having an open circuit resistance of 25,000 ohms has a switching potential of about 14 volts. The third film having an open circuit resistance of 11,000 ohms has the lowest value of switching potential of the three at 10 volts. The first film is not permitted to switch to its high resistance state so that the voltage across the resistor must not be permitted to approach the 18 volt level too closely. Since there is about a 4 volt separation between the switching potentials of the first and second films a fair margin of safety is provided in which to permit the second film to switch without inadvertently causing the first film to switch in the process.

Additional stable states may be obtained by electrically connecting still larger numbers of films together in parallel in the same manner as previously described. As has been noted with reference to FIGURES 8 and 11, in Example I the film having an open circuit resistance of 300 ohms switches to the high resistance state at about 4.2 volts. Such a film deposited and stabilized as previously described so as to be in parallel combination with the three films of Example III, provides a four-stable state discontinuous thin film resistor. In such a case switching between successive resistance states occurs at 4.2 volts, 10 volts, and 14 volts. Here, as in the case of the tri-stable state resistor of Example III, the 54,000 ohm first film having an 18 volt switching potential is maintained in its low resistance state at all times thereby affording overload protection to the other three films. As previously mentioned, the number of stable states obtainable depends on the extent to which the required number of films can be deposited and stabilized at sufficiently separate switching potentials to insure the switching of each film as desired without the inadvertent switching of the film having the next higher or lower switching potential. To some extent this ability depends upon the control features of the particular switching circuit in which the instant device is used as well as the ability to control the potential applied across the device.

Although the instant invention has been described with respect to specific details of certain embodiments thereof, such details are not intended to limit the scope of the instant invention except insofar as set forth in the following claims.

I claim:

1. A discontinuous thin film multi-stable resistor comprising a plurality of electrically conductive discontinuous thin films, each of said plurality of discontinuous films being characterized by a pair of distinctly separate voltage dependent resistance states, said plurality of discontinuous films forming a parallel connected electrical circuit, dielectric substrate means for said plurality of discontinuous films, means for stabilizing the electrical properties of said plurality of discontinuous films whereby the switching potentials of said plurality of discontinuous films are fixed in voltage value, said switching potentials being of different magnitudes, and terminal means for making electrical connections to said parallel circuit.

2. The resistor of claim 1 wherein said plurality of discontinuous films consists essentially of metal.

3. The resistor of claim 1 wherein said substrate means comprise a single dielectric substrate upon different portions of which each of said plurality of discontinuous films is disposed.

4. The resistor claim 1 wherein said substrate means comprises a plurality of dielectric substrates, each of said plurality of discontinuous films being disposed on a different member of said plurality of substrates.

5. The resistor of claim 1 wherein said stabilizing means comprise a plurality of barrier layers of electrically insulative material, each of said plurality of discontinuous films being covered by a different member of said plurality of layers, whereby the nucleations of each of said plurality of discontinuous films are restrained from agglomerating with the passage of time.

6. The resistor of claim 1 wherein said terminal means comprise a pair of spaced continuous films of highly conductive material, said parallel circuit being electrically connected between said pair of continuous films.

7. The resistor of claim 1 wherein said plurality of discontinuous films comprises a first and second discontinuous film whereby said resistor is bi-stable.

8. The resistor of claim 1 wherein said plurality of discontinuous films comprises a first, second, and third discontinuous film whereby said resistor is tri-stable.

9. The resistor of claim 4 wherein said terminal means comprise a plurality of pairs of spaced continuous films of highly conductive material whereby each of said plurality of discontinuous films is electrically connected between a different member of said plurality of pairs.

10. The resistor of claim 5 wherein said substrate means comprise a dielectric substrate upon which a first of said plurality of discontinuous films is disposed, the remainder of said plurality of discontinuous films and layers being alternatively disposed in stacked relationship.

11. The resistor of claim 5 wherein said insulative material consists essentially of a metallic oxide.

12. A discontinuous thin film bi-stable resistor comprising a dielectric substrate, a pair of spaced continuous gold film terminal electrodes disposed on said substrate, and a resistive element electrically connected between said pair of spaced electrodes, said element comprising a first discontinuous thin gold film disposed on said substrate, a first layer of barium oxide barrier material disposed on said first discontinuous film, a second discontinuous thin gold film disposed on said first layer, said first and second discontinuous films being electrically connected in parallel, and having different switching potentials, and a second layer of barium oxide barrier material disposed on said second discontinuous film.

13. A discontinuous thin film bi-stable resistor comprising a pair of dielectric substrates, two pairs of spaced continuous tantalum film terminal electrodes, each of said pair of electrodes being disposed on a different member of said pair of substrates, and a pair of stabilized resistive films, each of said pair of stabilized films being disposed on a different member of said pair of substrates and being electrically connected between a pair of said electrodes, said pairs of electrodes being electrically connected so as to electrically connect said pair of stabilized films in parallel, said pair of stabilized films having different switching potentials, each of said pair of stabilized films comprising a discontinuous tantalum film, and a barrier layer of tantalum pentoxide on said discontinuous film.

References Cited

UNITED STATES PATENTS

| | | | |
|---|---|---|---|
| 3,277,313 | 10/1966 | Unterkofler | 307—88.5 |
| 3,359,448 | 12/1967 | Bashara et al. | 313—326 |
| 3,356,864 | 12/1967 | Giaever | 307—88.5 |
| 3,355,320 | 11/1967 | Spriggs et al. | 117—210 |

JOHN W. HUCKERT, Primary Examiner

M. EDLOW, Assistant Examiner

U.S. Cl. X.R.

117—212, 210; 338—314, 308; 317—235, 238

UNITED STATES PATENT OFFICE
CERTIFICATE OF CORRECTION

Patent No. 3,474,305          Dated October 21, 1969

Inventor(s) Raymond E. Szupillo

It is certified that error appears in the above-identified patent and that said Letters Patent are hereby corrected as shown below:

Column 10, line 18, Claim 10, "alternatively" should read ''alternately''.

SIGNED AND
SEALED
FEB 24 1970

(SEAL)
Attest:

Edward M. Fletcher, Jr.
Attesting Officer

WILLIAM E. SCHUYLER, JR.
Commissioner of Patents